April 20, 1937. P. B. STREANDER 2,077,498
DISPOSAL OF SEWAGE AND THE LIKE
Filed March 13, 1935
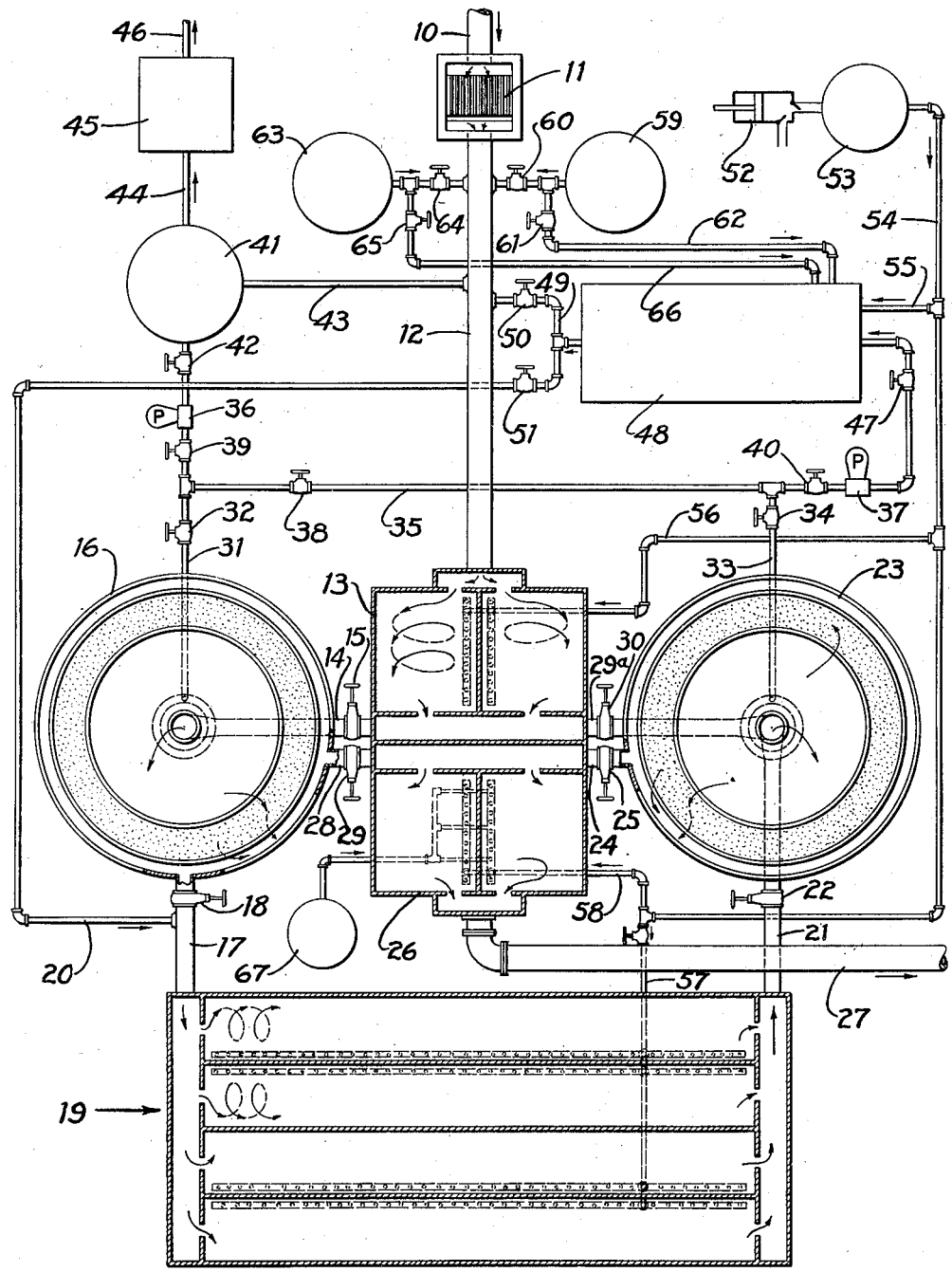
INVENTOR
Philip B. Streander
BY
his ATTORNEY Patented Apr. 20, 1937

2,077,498

UNITED STATES PATENT OFFICE 2,077,498

DISPOSAL OF SEWAGE AND THE LIKE

Philip B. Streander, Scarsdale, N. Y., assignor, by mesne assignments, to Underpinning & Foundation Company, Inc., New York, N. Y., a corporation of New York Application March 13, 1935, Serial No. 10,765

2 Claims. (Cl. 210—2)

This invention relates to the treatment of sewage or the like and more particularly to treatment by the use of biological flocculation or chemical flocculation in accordance with varying conditions. In such biological flocculation, sewage is treated by biological means as by the so called activated sludge process and, in the chemical flocculation, sewage is partially treated by the addition of chemicals to flocculate, precipitate, and/or filter out the major proportion of the suspended solid content.

The effluents from sewage treatment plants are all discharged into natural water courses and dilution of the sewage effluent with the receiving water constitutes a component part of the disposal process. The capability of any stream to receive, and dispose of without nuisance, a treated sewage effluent depends largely on the volume of flow in the stream and the amount of dissolved oxygen present in the water. In many instances the receiving water or water course, is a stream subject to considerable variations in flow, principally seasonal, and concurrent variations in dissolved oxygen. The operating cost of a treatment plant is an item of major expense, and any economies, which may be effected in such treatment costs, would result in large savings to the municipalities concerned. The degree of treatment required to prevent a nuisance depends largely on the total amount of dissolved oxygen in the stream and, since the stream is subject to seasonal and other variations, it can readily be seen that, by effecting treatment inversely proportional to the amount of dissolved oxygen present in the water instead of treatment capable of meeting the requirements of minimum dissolved oxygen content, substantial economies may be effected.

An important object of the invention is to provide a novel and advantageous biological and flocculation process of sewage treatment and another important object is to provide novel and advantageous apparatus adapted for use in carrying out such process.

In carrying the invention to the greatest advantage use is made of a plant adapted for both biological and chemical flocculation and arranged so that its various parts can be utilized to the fullest extent in connection with each of these processes of treatment. This will reduce decidedly the capital cost of the plant and will also reduce the annual operating expense. Using a typical condition for illustration, the amount of sewage to be treated is 1,200,000 gallons per day and the stream into which the treated sewage will be discharged has an average dry season flow of 10,000,000 gallons per day and an average wet season flow of 25,000,000 gallons per day. The amount of dissolved oxygen for these flow conditions would be 775 pounds and 2100 pounds per day, respectively, the amount of dissolved oxygen present being the index of the degree of treatment required. During the period of dry season flow, the plant would be operated as a biological flocculation plant to provide a high degree of treatment or reduction in the so called bio-chemical oxygen demand of more than 90 per cent. During period of wet season flow the plant would be operated as a chemical flocculation plant to provide a lesser degree of treatment, reducing the bio-chemical oxygen demand of the sewage by between 50% and 70% depending upon the volume of the diluting water available in the stream or waterway.

According to a preferred embodiment of apparatus for carrying out the present invention use is made of an aeration and skimming tank where by aeration flotation of ether soluble matter, greases and oils is effected and toxic gases interfering with subsequent treatment are removed, two combined clarification and filtration units, a large aeration unit, an aerated contact tank, and a sludge regeneration tank. In flocculating either chemically or biologically the raw sewage is passed through a bar screen to remove the larger solids before the sewage passes into the aeration and skimming tank. When it is necessary to provide a high degree of treatment to reduce the oxygen demand, the sewage passes from the aeration and skimming tank into one of the clarification and filtration units in which a large portion of the suspended solids is removed by settling and filtering. The sewage having been mixed with biologically active sludge flows into a large aeration unit where the sewage and the returned sludge are kept in constant agitation by air blown therethrough and by mechanical agitators or other means, being maintained in this unit a sufficient length of time to accumulate a large proportion of the colloidal substance and to be thoroughly aerated. The sewage then passes into the second or other clarification and filtration unit in which the sludge produced in the aeration tank is caused to separate from the sewage liquor by settling and the sewage liquor is filtered whereby substantially all of the suspended solids are removed. From this clarification and filtration unit the treated sewage is discharged into the aerated contact tank where chlorine or other sterilizing agents are added so as to destroy effectually bacteria in the sewage and deliver a clear sterile effluent for discharge from the system. With this arrangement sludge settling out in the last mentioned settling tank is removed and passed to the large aeration unit or into the sludge regeneration tank. In this method of treatment it has been found that regeneration of the sludge by forced aeration or by the addition of alkaline and coagulating salts, such as iron or aluminum salts, materially increases the effectiveness of the treatment. Excess volumes of sludge may be wasted from the regeneration tank to the incoming raw sewage, or disposed of in other approved ways.

If the plant be operated as a chemical flocculation one, raw sewage from the bar screen, after the addition thereto of coagulating chemicals, is passed to the first tank which now serves as a flocculation tank instead of an aeration and skimming tank. The coagulating chemicals may consist of ferrous and/or aluminum salts and an alkaline substance, such as lime, if required. Previously precipitated and regenerated sludge may also be mixed with the entering raw sewage to accelerate precipitation by mass action of the conglomerate. In the flocculation tank the mixture of sewage and chemicals is agitated by means of compressed air or by mechanical means so as to cause the thorough flocculation and aggrandizement of the colloidal matter in the sewage. The flocculated sewage passes into the two clarification and filtration units or tanks operating in parallel, the coagulated sewage solids being partly removed by settling and the major portion of the residue being removed by filtration. The effluent from these units is discharged into the contact unit or tanks for sterilization which may be effected by the addition of chlorine or any other suitable sterilizing agent to the sewage either as it enters the tank or at various points in the tank for repeated and continuous action of the sterilizing media on the bacteria to be destroyed. Sludge removed from the combined clarification units may be returned to a sludge regeneration unit or tank for additional treatment prior to its return to the raw sewage for acceleration of the treatment thereof, or may be discharged directly to apparatus provided for its final dewatering and/or disposal. This apparatus may consist of a sludge conditioning and decanting tank and dewatering means, such as a vacuum filter, for the derived sludge, or may comprise other means such as centrifuges for mechanical dewatering or drained drying beds. When the plant is used for chemical flocculation, the activated sludge aeration unit is not used, and, inasmuch as there may be a seven month period of such operation in each year, the resulting saving in power enables a considerable saving in operating costs.

Other objects, features and advantages will appear upon consideration of the following description and of the drawing in which the single figure is a diagrammatic view of a plant constituting a preferred embodiment of the invention.

The plant or apparatus will first be described in connection with its operation as a biological flocculation plant. Referring to the drawing, raw sewage from an incoming pipe 10 passes through a bar screen 11 to a pipe 12 which discharges into a so called aeration and skimming tank 13 where the aeration causes flotation of ether soluble matter, greases and oils, and removal of toxic gases adapted to interfere with subsequent treatment. The effluent or sewage passes from the tank 13 through a pipe 14, controlled by a valve 15, to a clarification and filtration unit or tank 16. The unit 16 is illustrated as made up of a settling tank and a filter surrounding the same, but it is obvious that the unit may be made up of corresponding parts arranged in different ways and that the settling tank and the filter may be replaced by corresponding parts at a considerable distance apart. A large portion of the suspended solids are removed in this unit by settling and filtration.

From the clarification and filtration unit 16, the sewage passes through a pipe 17, provided with a valve 18, to an aeration unit or tank 19 where biological flocculation takes place with the assistance of biologically active sludge added to the sewage in the pipe 17 from a line 20 supplied from a suitable source to be referred to later. In this tank the sewage and added sludge are kept in constant agitation by air blown through the sewage, by mechanical agitators or by other means and is kept in this tank a considerable length of time so that a large proportion of the colloidal substance in the sewage will be accumulated and the sewage will be thoroughly aerated and oxidized.

The sewage flows from the biological flocculation aeration tank through a pipe 21, controlled by a valve 22, to a clarification and filtration unit 23, which may be substantially the same as unit 16, and in which the sludge produced in the unit 19 is separated from the liquor or effluent by settling and the liquor thus clarified is passed through the filter which removes practically all of the suspended solids.

The effluent from the unit 23 passes through a pipe 24, controlled by a valve 25, into a contact tank 26 where chlorine or other sterilizing agent is added to effectually destroy bacteria in the sewage and produce a clear sterile effluent for discharge through a pipe 27. For reasons to be brought out hereinafter, provision is made of a pipe 28 whereby filtered sewage from the clarification and filtration unit 16 may be passed directly to the contact tank 26, and of a valve 29 in said pipe 28. Provision is also made of a pipe 29a, controlled by a valve 30, whereby sewage from the unit or tank 13 may be passed directly to the clarification and filtration tank 23.

The sludge from the clarification and filtration unit 16 is drawn off through a pipe 31 in which is a valve 32 and the activated sludge from the unit 23 is drawn off through a pipe 33 provided with a valve 34. The pipes or lines 31 and 33 discharge into a line 35 between two pumps 36 and 37 adapted to draw the sludge in opposite directions, provision being made of a valve 38 in the line 35 between its connections with the lines 31 and 33 and valves 39 and 40 also in the line 35 but in one instance between the pump 36 and the connection with the line 31 and in the other instance between pump 37 and the connection with the line 33. This arrangement of valves makes it possible for the sludge from both units 16 and 23 to be drawn off either by pump 36 or by pump 37, or for the sludge from the unit 16 to be drawn off by pump 36 and the sludge from the unit 23 to be drawn off by pump 37. The sludge from the pump 36 passes into a sludge conditioning and decanting tank 41, the connection between them being provided with a valve 42 to be closed when the pump is not working. The decanted liquor passes from the tank 41 through a line 43 which discharges into the raw sewage line 12, and the sludge passes through a line 44 to a dewatering unit or tank 45 from which it is drawn through a pipe 46 and disposed of in any suitable manner.

From the pump 37 the sludge passes through a valve 47, to be closed when the pump is stopped, into a sludge regeneration unit or tank 48 connected with the raw sewage line 12 by means of a line or pipe 49 provided with a shutoff valve 50 and also connected through a valve 51 with the line 20.

For aeration purposes, provision may be made of a compressor 52, a receiver 53 in which compressed air is stored, and an air line 54 leading from the receiver and provided with a branch 55 leading to the sludge regeneration unit 48, a branch 56 leading to the unit 13, a branch 57 leading to the aeration unit 19, and a branch 58 leading to the unit 26.

A receptacle 59 containing coagulating material such as ferrous sulphate is connected through a valve 60 with the raw sewage pipe 12 and through a valve 61 and line 62 to the sludge regenerating tank 48, and a receptacle 63 containing alkaline substance such as lime is connected through a valve 64 to the raw sewage line 12 and through a valve 65 and a line 66 with the unit 48. The sterilizing agent such as chlorine may be stored in a receptacle 67 and fed to the contact tank 26 through a pipe or line 68.

When operating as a biological flocculation plant, the valves 28, 30 are closed and the valves 15, 25, 18 and 22 are open, the sewage then passing in succession through the unit 13 which in this operation acts as an aerating and skimming unit, the clarification and filtration unit 16, the biological flocculation unit 19 receiving the filtered sewage from unit 16 and activated sludge from the line 20, the second clarification and filtration unit 23 to remove the sludge formed in unit 19, and the tank or unit 26 in which the effluent from the unit 23 is sterilized before it is discharged through the pipe 27. By closing the valve 38 and opening the valves 32, 39 and 42, the pump 36 may be used to draw the sludge from the unit 16 and pass it to the sludge conditioning and decanting unit 41 from which the decanted liquor passes to the raw sewage line 12 and the conditioned sludge passes to the sludge dewatering device 45. With the valve 38 closed and the valves 34, 40 and 47 open, the pump 37 will draw the activated sludge from the unit 23 and pass it to the sludge regeneration unit 48. The valve 51 is also open so that sludge from the unit 48 will pass through the line 20 and the pipe 17 to the biological flocculation unit 19 to stimulate the action therein. Also if desired the valve 50 may be open to allow sludge to be returned to the raw sewage line 12. Either by forced aeration or by the addition of alkaline and coagulating material, from the receptacles 63 and 59, to the regeneration tank 48 the effectiveness of the treatment is materially increased.

For operation as a chemical flocculation plant, the valves 60 and 64 are open to admit to the raw sewage line 12 coagulating chemicals such as ferrous and/or aluminum salts and alkaline substance such as lime if required. Previously precipated sludge may be regenerated in the regeneration unit 48 and returned through the open valve 50 to the raw sewage line 12. In the unit 13 which now serves as a flocculation tank the mixture of sewage, chemicals and regenerated sludge is agitated suitably, as by compressed air, so as to cause the thorough flocculation and aggrandizement of the colloidal matter in the sewage. The flocculated sewage then flows into the combined clarification and filtration units 16 and 23 operating in parallel, where the coagulated solids are partly removed by settling and the major part of the residue removed by filtration, the effluent being discharged into the contact unit 26 for sterilization. Sludge removed from the units 16 and 23 may be passed to the sludge regeneration unit 48 for additional treatment prior to its return to the raw sewage, or it may be discharged directly to the apparatus provided for the final dewatering and disposal of the sewage. In this mode of operation the aeration unit 19 is not used and, inasmuch as the period of operation in this way may be as much as seven months in each year, the saving in power would result in a considerable saving in operating costs.

It should be understood that changes may be made in various features and that certain features may be used without others without departing from the true scope and spirit of the invention.

Having thus described my invention, I claim:

1. In apparatus for treating a stream of raw sewage and the like, a conduit through which the sewage is supplied, two combined settling and filtration units, a biological flocculation unit, a valve connection between the supply conduit and each of said settling and filtration units, and a valve connection between each of said settling and filtration units and said biological flocculation unit, a discharge conduit, and a valve connection between each of said settling and filtration units and said discharge conduit whereby the sewage may be passed in succession through one of said settling and filtration units, the biological flocculation unit, the other settling and filtration unit and the discharge conduit, or in parallel through said settling and filtration units to said discharge conduit.

2. In apparatus for treating a stream of raw sewage and the like a conduit through which the sewage is supplied, two combined settling and filtration units, a biological flocculation unit, a valve connection between the supply conduit and each of said settling and filtration units, and a valve connection between each of said settling and filtration units and said biological flocculation unit, a sterilizing unit in which the sewage is aerated in contact with a sterilizing agent, and a valve connection between each of said settling and filtration units and said sterilizing unit whereby the sewage may be passed in succession through one of said settling and filtration units, the biological flocculation unit, the other settling and filtration unit and the sterilization unit, or in parallel through said settling and filtration units to said sterilizing unit.

PHILIP B. STREANDER.